Oct. 23, 1951 F. C. WALLACE 2,572,080

PULSE WIDTH CONTROLLING RELAY SYSTEM

Filed Oct. 3, 1945

INVENTOR.
FRED C. WALLACE

BY Percy P. Lantzy

ATTORNEY

Patented Oct. 23, 1951 2,572,080

UNITED STATES PATENT OFFICE 2,572,080

PULSE WIDTH CONTROLLING RELAY SYSTEM

Fred C. Wallace, New York, N. Y., assignor to Federal Telephone and Radio Corporation, New York, N. Y., a corporation of Delaware Application October 3, 1945, Serial No. 620,142

3 Claims. (Cl. 250—27)

Figure 1:
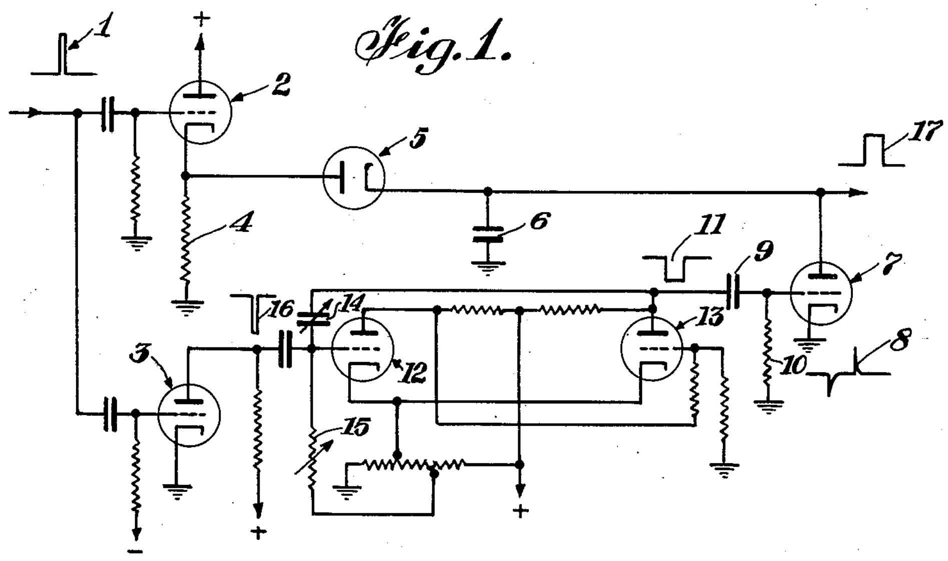

This invention relates to a pulse width changing system, and more specifically, to a system for changing the width of pulses to a predetermined duration while retaining amplitudes proportional to the original pulse amplitude values.

In the transmission of pulses it is often of prime importance that the duration of the pulses be kept as short as possible in order that the average output power be low while the peak pulse power transmitted may be made very large. Many applications of pulse receiving systems cannot utilize extremely narrow pulses advantageously; for example, it would be difficult to observe the pattern created by the almost indistinguishable tips of a train of such received pulses on the screen of an oscilloscope. However, widening of these pulses would remedy this difficulty somewhat. If this widening is performed at the point of transmission there is a consequent expenditure of a greater amount of power than would otherwise be utilized, but, should the widening be accomplished after the reception of narrow pulses, a great economy of transmitting power would be realized to produce the same improved result. It is necessary, of course, to preserve a linear relationship between amplitudes of the received and widened pulses since the usefulness of the type of pulse system referred to depends on pulse amplitude indications.

Audibility of received pulsed signals which are amplitude modulated may also be increased when these signals are widened and hence produce a higher average power output than was available prior to the widening operation. Also, a system which makes it possible to obtain pulses of a constant width which are proportional in amplitude to the amplitudes of pulses which are both amplitude and width modulated would be useful for producing an output proportional to the amplitude modulation component alone.

Consequently, it is an object of this invention to provide a pulse system which widens pulses to any predetermined length in time less than the minimum spacing between pulses and retains a proportionality between amplitudes of the original and widened pulses.

A second object is to provide a pulse system which changes the width of pulses to any desired value not exceeding the minimum spacing between the original pulses and which maintains amplitude of the widened pulses proportional to the amplitudes of the original pulses.

Another object of this invention is to provide a device for increasing the pulse output power and signal-to-noise ratio of a receiving system responsive to pulses having a very short duty cycle.

It is a further object to provide a device for producing a pulse output containing only the amplitude modulation component of pulse input signals which include both pulse width and amplitude modulation components.

In accordance with one feature of the present invention, the pulse width changing system comprises a linear amplifier excited by a narrow pulse input, a condenser which charges to the maximum amplifier output voltage produced by each individual pulse and which is prevented from discharging through the amplifier by a diode in series with the condenser, and a circuit, also excited by the same pulse input, for discharging this condenser after a predetermined time following the occurrence of each input pulse.

Figure 2:
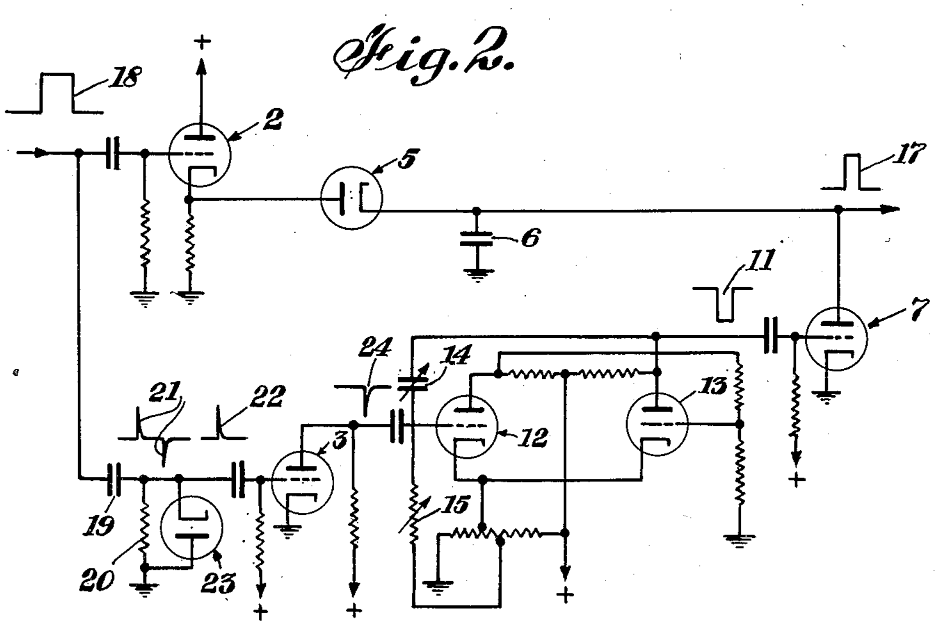

These and other objects of this invention may become apparent, and a better understanding of the features thereof may be obtained from a detailed description made with reference to the accompanying drawings in which:

Fig. 1 is a schematic diagram of a pulse widening circuit together with sketches of voltage wave-forms at important points; and Fig. 2 is a schematic diagram, together with sketches of wave-forms at selected points, of a modification of Fig. 1 which may also produce constant-width output pulses of shorter duration than the input pulses.

Referring to Fig. 1, the input pulse signal 1 is fed to the grid circuits of two single tube amplifiers 2 and 3. The cathode follower amplifier stage including tube 2 and cathode follower resistor 4, produces a voltage across 4 which is linearly related in amplitude to the input signal 1. In series across resistor 4 are a diode 5 and a condenser 6. This condenser 6 charges to the maximum voltage which occurs across 4 due to the occurrence of any positive pulse signal on the grid of tube 2. The value of the condenser is chosen to allow a complete charge in a shorter time than the duration of the shortest pulse length with which it is desired to utilize this pulse system. It is not possible for condenser 6 to discharge through resistor 4 when no voltage drop appears across 4 because of the presence of diode 5. Insofar as the circuit has been treated up to this point, if a positive sharp input voltage pulse were applied to the grid of tube 2, the result would be a direct current potential, appearing across condenser 6, which has a steady value proportional to the maximum amplitude of the input pulse. This potential will remain at a substantially steady value across 6 until the condenser is discharged.

Pulses of any desired width less than the minimum spacing between input pulses may be obtained from across condenser 6 if this condenser is discharged at a predetermined time following the occurrence of the input pulse 1. It becomes necessary, then, to provide a means for discharging condenser 6 in the prescribed manner. This is accomplished by triggering a discharge tube 7 connected across this condenser 6 and normally biased beyond cut-off, with a positive pulse 8 at the required time. This positive pulse 8 is produced by the combination of condenser 9 and resistance 10 which differentiate the rectangular negative pulse output 11 of the "single shot" multivibrator including tubes 12 and 13. The duration of negative pulse 11 is controllable by adjustment of condenser 14 or resistance 15 in the multivibrator circuit. Excitation of the tube 12 of the multivibrator circuit is obtained from the negative pulse output 16, of the single tube amplifier stage 3 and which is fed by the input pulse 1. It should be clear that the discharging of condenser 6 can be accomplished at any desired time following the delivery of a pulse to tube 12 by simply adjusting the pulse width control time constant elements 14 or 15 of the multivibrator. The desired output voltage pulse is indicated by numeral 17.

When a pulse output of shorter duration than an input pulse is required from across condenser 6, it becomes necessary to short this condenser at all times other than when output voltage is taken from across its terminals. Fig. 2 shows how this may be done with a few changes in the circuit of Fig. 1. In Fig. 2, the electron discharge device 7, biased so that it provides a conductive path across condenser 6 except when pulsed beyond cut-off, replaces the discharging arrangement of Fig. 1. Also, the differentiating circuit comprising condenser 9 and resistance 10, in Fig. 1, is not required since the rectangular negative pulse output 11 of the multivibrator will properly bias tube 7 for the desired length of time. In order that the negative triggering pulse 24, for the multivibrator shall be very short the positive input pulse 18 is differentiated by the combination of condenser 19 and resistor 20 to produce pulses indicated by 21, of which only the positive pulses, represented by 22, are allowed to pass across diode 23. When inverted by tube 16, these pulses similar to 24 will trigger the multivibrator into operation as required. Action of the modified circuit is similar to that discussed with regard to the preceding figure except that a conductive path across the condenser 6 exists at all times exclusive of the intervals during which negative pulses from the multivibrator exist. Obviously a negligible voltage would appear across condenser 6 when tube 7 short circuits the cathode-follower resistor 4. Hence, pulses may be obtained in the output of this system which are of shorter length in time than the corresponding input pulses and yet a proportional relation between amplitudes of an input pulse 18 and output pulse 17 will be preserved.

The multivibrator circuit employed with the embodiments of this invention diagrammed in Figs. 1 and 2 is of the "single shot" type, that is, one which is biased to return to a stable condition after each excitation, triggered into operation by a negative pulse on the grid of tube 12. The voltage wave shape at the plate of tube 13 is a rectangular negative pulse which has a starting time determined by the pulse output 16 or 24 of the amplifier stage which incorporates tube 3. The pulse length of 11 is determined by the time constant of the combination of condenser 14 and resistance 15.

Typical applications of this invention might be, for example, the widening of pulses to increase the visibility of pulse tips appearing on a cathode ray tube screen, to increase the audibility of received pulsed signals, or to obtain the amplitude modulation component of a pulse signal which may be, in addition, width modulated. The signal-to-noise ratio in a communication system which utilizes amplitude modulated pulse signals having a very short duty cycle is much greater than in similarly modulated carrier or longer pulse systems of the same average power. Since the present invention can change the width of received pulses to values where audibility is increased, the use of very short pulses in communication systems is made more practical and the relatively noise-free and longer range advantages of peak power transmission are realizable.

It should be obvious to those skilled in the art that there are many possible modifications which are not actually different in spirit or principle from this invention. For example, means other than those described may be provided for discharging the condenser across which the output voltage is taken, or conceivably some means other than a multivibrator might be employed to control the charge-retaining time of the same condenser.

While the invention has been described with respect to specific embodiments, it is clear that many other types of circuits may be provided. The particular embodiments presented above are intended merely by way of illustration and should not be considered as limitations on the scope of this invention as set forth in the objects and in the appended claims.

I claim:

1. A system for changing the width of signal pulses comprising a source of said signal pulses, a storage device, a first coupling amplifier coupling said source to said storage device to charge it according to the output voltage of said first amplifier, a normally blocked discharge path for said storage device connected thereto and including an electron discharge device adapted upon conduction to close said path and discharge said storage device, a circuit adapted to produce a control pulse whose width is adjustable independently of the width of the input pulse, a second coupling amplifier coupling said source to said circuit so that said circuit is actuated by the signal pulses independently of the voltages appearing across said storage device, means responsive to the control pulses for rendering said electron discharge device conductive and discharging said storage device, and connections for taking off an output voltage from across said storage device.

2. A system for changing the width of signal pulses comprising a source of said signal pulses, a storage device, a first coupling amplifier coupling said source to said storage device to charge it according to the output voltage of said first amplifier, a normally blocked discharge path for said storage device coupled thereto and including an electron discharge device adapted upon conduction to close said path and discharge said storage device, a trigger circuit adapted to produce a control pulse whose width is adjustable independently of the width of the triggering pulse, a second coupling amplifier coupling said source to said trigger circuit so that said trigger circuit is triggered by the signal pulses independently of the voltages appearing across said storage device, means for differentiating the control pulse to produce short pulses corresponding to the leading and trailing edges thereof, means for applying the short pulse corresponding to the trailing edge to said electron discharge device to render it conductive and discharge said storage device, and connections for taking off an output voltage from across said storage device.

3. A system for changing the width of signal pulses comprising a source of said signal pulses, a storage device, means responsive to said signal pulses for charging said storage device, a normally blocked discharge path for said storage device coupled thereto and including an electron discharge device adapted upon conduction to close said path and discharge said storage device, a circuit responsive to said signal pulses for producing control pulses whose width is adjustable independently of the width of the signal pulses, means for differentiating the control pulses to produce short pulses corresponding to the leading and trailing edges of each of said control pulses, means for applying the short pulses corresponding to the trailing edge to said electron discharge device to render it conductive and discharge said storage device, and connections for taking off an output voltage from across said storage device.

FRED C. WALLACE.

REFERENCES CITED

The following references are of record in the file of this patent:

UNITED STATES PATENTS

| Number | Name | Date |
|---|---|---|
| 2,294,863 | Hadfield | Sept. 1, 1942 |
| 2,405,069 | Tonks | July 30, 1946 |
| 2,405,070 | Tonks | July 30, 1946 |
| 2,409,897 | Rado | Oct. 22, 1946 |
| 2,419,340 | Eaton | Apr. 22, 1947 |

FOREIGN PATENTS

| Number | Country | Date |
|---|---|---|
| 491,741 | Great Britain | Sept. 8, 1938 |